US008316315B2

(12) United States Patent
Portnoy et al.

(10) Patent No.: US 8,316,315 B2
(45) Date of Patent: Nov. 20, 2012

(54) AUTOMATICALLY GENERATED HIGHLIGHT VIEW OF ELECTRONIC INTERACTIONS

(75) Inventors: William L. Portnoy, Seattle, WA (US); Lili Cheng, Bellevue, WA (US); Scott J. Counts, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 809 days.

(21) Appl. No.: 11/069,443

(22) Filed: Feb. 28, 2005

(65) Prior Publication Data

US 2006/0195785 A1 Aug. 31, 2006

(51) Int. Cl.
*G06F 3/048* (2006.01)
*G06F 3/01* (2006.01)

(52) U.S. Cl. ........ 715/772; 715/764; 715/789; 715/817; 715/825

(58) Field of Classification Search ................. 715/751, 715/763–764, 772, 789, 817, 825; 707/102
See application file for complete search history.

(56) References Cited

U.S. PATENT DOCUMENTS

| | | | |
|---|---|---|---|
| 5,956,486 A | 9/1999 | Hickman et al. | |
| 6,052,121 A | 4/2000 | Webster et al. | |
| 6,125,366 A | 9/2000 | Bernstein et al. | |
| 6,330,676 B1 * | 12/2001 | Kelsey | 726/7 |
| 6,369,840 B1 | 4/2002 | Barnett et al. | |
| 6,374,145 B1 | 4/2002 | Lignoul | |
| 6,380,959 B1 | 4/2002 | Wang et al. | |
| 6,389,372 B1 | 5/2002 | Glance et al. | |
| 6,473,752 B1 | 10/2002 | Fleming, III | |
| 6,480,885 B1 | 11/2002 | Olivier | |
| 6,530,081 B1 | 3/2003 | Hayes, Jr. | |
| 6,560,711 B1 | 5/2003 | Given et al. | |
| 6,594,463 B2 | 7/2003 | Watanabe | |
| 6,665,805 B1 | 12/2003 | Tsirkel et al. | |
| 6,675,197 B1 | 1/2004 | Satoh et al. | |
| 6,681,108 B1 | 1/2004 | Terry et al. | |
| 6,691,162 B1 | 2/2004 | Wick | |
| 6,714,967 B1 | 3/2004 | Horvitz | |
| 6,721,748 B1 * | 4/2004 | Knight et al. | 707/10 |
| 6,748,395 B1 | 6/2004 | Picker et al. | |

(Continued)

OTHER PUBLICATIONS

Zack Brown, Kernel Traffic #293 for Jan. 9, http://www.kerneltraffic.org/kernel-traffic/latest.html, last viewed on Jan. 17, 2005.

(Continued)

*Primary Examiner* — Nicholas Augustine
(74) *Attorney, Agent, or Firm* — Lee & Hayes, PLLC

(57) ABSTRACT

A system and method for generating a highlight view of electronic interactions, such as, emails, instant messages, audio messages and/or video messages is provided. The highlight view can facilitate a user's understanding of the electronic interactions.

The electronic interactions can comprise emails associated with conversation threads of a discussion list posted and/or received by a plurality of users. The highlight view system can include, for a given period of time, a list of participants in the discussion list, a list of conversation threads and/or a linear progression of one or more of the conversation threads. The linear progression of one or more conversation threads can include signal word(s), such as, "stated, "asked", "responded", "wrapped up", "disagreed", "agreed" etc. that facilitate a user's comprehension of the individual e-mails which form the conversation thread.

An electronic interactions highlight system can include an input component that receives electronic interactions (e.g., emails associated with conversation thread(s) of a discussion list) and an analysis component that analyzes the electronic interactions and automatically generates a highlight view of the electronic interactions.

20 Claims, 8 Drawing Sheets

U.S. PATENT DOCUMENTS

| | | | |
|---|---|---|---|
| 6,816,885 B1 | 11/2004 | Raghunandan | |
| 6,832,245 B1 | 12/2004 | Isaacs et al. | |
| 6,868,525 B1 | 3/2005 | Szabo | |
| 6,922,488 B2 | 7/2005 | Mastrianni et al. | |
| 7,100,203 B1 | 8/2006 | Tosey | |
| 7,167,910 B2 | 1/2007 | Farnham et al. | |
| 7,181,438 B1 | 2/2007 | Szabo | |
| 7,203,911 B2 | 4/2007 | Williams | |
| 7,274,375 B1* | 9/2007 | David | 345/619 |
| 7,328,241 B2 | 2/2008 | Ribak et al. | |
| 7,343,365 B2 | 3/2008 | Farnham et al. | |
| 2002/0073056 A1* | 6/2002 | Broster et al. | 707/1 |
| 2002/0138477 A1 | 9/2002 | Keiser | |
| 2003/0158855 A1* | 8/2003 | Farnham et al. | 707/102 |
| 2003/0167324 A1* | 9/2003 | Farnham et al. | 709/224 |
| 2003/0229648 A1* | 12/2003 | Tang et al. | 707/104.1 |
| 2004/0003028 A1 | 1/2004 | Emmett et al. | |
| 2004/0054670 A1* | 3/2004 | Noff et al. | 707/3 |
| 2004/0088325 A1 | 5/2004 | Elder et al. | |
| 2004/0135816 A1 | 7/2004 | Schwartz et al. | |
| 2004/0148346 A1 | 7/2004 | Weaver et al. | |
| 2004/0201602 A1* | 10/2004 | Mody et al. | 345/700 |
| 2004/0230599 A1* | 11/2004 | Moore et al. | 707/102 |
| 2004/0267701 A1* | 12/2004 | Horvitz et al. | 707/2 |
| 2005/0001743 A1* | 1/2005 | Haemerle | 340/988 |
| 2005/0027845 A1 | 2/2005 | Secor et al. | |
| 2005/0256956 A1* | 11/2005 | Littlefield et al. | 709/225 |
| 2006/0075044 A1* | 4/2006 | Fox et al. | 709/206 |
| 2006/0170705 A1* | 8/2006 | Wilson | 345/628 |
| 2006/0190493 A1* | 8/2006 | Kawai et al. | 707/104.1 |
| 2007/0192299 A1 | 8/2007 | Zuckerberg et al. | |

OTHER PUBLICATIONS

Zack Brown, Kernel Traffic, http://www.kerneltraffic.org, last viewed on Feb. 1, 2005.

Non-Final Office Action for U.S. Appl. No. 11/069,443, mailed on Aug. 30, 2011, William L. Portnoy, "Automatically Generated Highlight View of Electronic Interactions", 16 pages.

* cited by examiner

AUTOMATICALLY GENERATED HIGHLIGHT VIEW OF ELECTRONIC INTERACTIONS

TECHNICAL FIELD

The subject invention relates generally to electronic interactions (e.g., conversation threads of a discussion list) and, more particularly, to automatic generation of a highlight view associated with electronic interactions.

BACKGROUND OF THE INVENTION

With the development of computer connectivity systems, such as the Internet, users have been communicating electronically to meet, interact, and collaborate with others. Electronic interactions can occur via asynchronous modalities such as email, discussion and news group threads or postings, for example.

Computer users have taken advantage of this increased connectivity to maintain, expand, and enhance their personal and professional lives. Thus, users interact with others online for a variety of different reasons and, as a result, a vast number of online communities have emerged to meet Internet users' various personal, social, recreational, and professional needs. While these online communities may differ in the modes of interaction and services offered to members, a primary function of these communities is to help people establish and maintain interpersonal connections with others and/or obtain pertinent information.

Generally, there are two types of existing systems that facilitate interactions over a social network. One is a notification system in which a member of a group receives whatever content is posted to a group. For example, a distribution list merely propagates a posted piece of email to everyone on the list. Further, a group notification can be issued indicating that something or a quantity of items was posted during a period of time such as for a week. Alternatively, posted items can be periodically sent to members directly or in the form of link(s). Another type of system is a syndicated system in which recent content posted by a source is available to subscribers through automated uploads of the contents.

Both these approaches essentially either replicate substantially all content that has been posted (e.g., copy of original content or link to the content), or possibly supply shortcut information such as "X many-new-items-posted". These systems can be difficult to manage for large groups and/or a large quantity of content. Also, relevant data is difficult to discern from the information that may have little or no interest to a particular user.

SUMMARY OF THE INVENTION

The following presents a simplified summary of the subject invention in order to provide a basic understanding of some aspects of the subject invention. This summary is not an extensive overview of the subject invention. It is not intended to identify key/critical elements of the subject invention or to delineate the scope of the subject invention. Its sole purpose is to present some concepts of the subject invention in a simplified form as a prelude to the more detailed description that is presented later.

The subject invention provides for a system and method for generating a highlight view of electronic interactions, such as, documents, emails, instant messages, audio messages and/or video messages. The highlight view can facilitate a user's understanding of the electronic interactions. For example, the electronic interactions can comprise emails associated with conversation threads of a discussion list posted and/or received by a plurality of users. The highlight view generated by the system can include, for a given period of time, a list of participants in the discussion list, a list of conversation threads, a quantity of message(s) in a particular conversation thread, URLs and/or file shore location(s), if any, referred to in the conversation thread and/or a linear progression of one or more of the conversation threads. The highlight view can be sent via email to one or more of the users.

In accordance with an aspect of the subject invention, an electronic interaction highlight system includes an input component that receives electronic interactions (e.g., emails associated with conversation thread(s) of a discussion list). The system further includes an analysis component that analyzes the electronic interactions and automatically generates a highlight view of the electronic interactions.

The highlight view facilitates a user's review of the electronic interactions. The highlight view can include, for example, for a given period of time, a list of participants in the discussion list, a list of conversation threads and/or a linear progression of one or more of the conversation threads. The linear progression of one or more conversation threads can include signal word(s), such as, "stated, "asked", "responded", "wrapped up", "disagreed", "agreed" etc. that facilitate a user's comprehension of the individual e-mails which form the conversation thread(s).

The analysis component can organize the highlight view based on relevance of a plurality of discussion topics. Relevance can be based, for example, on the quantity of electronic interactions (e.g., emails/postings) associated with the discussion topics. Discussion topics with high traffic can be treated as more relevant than discussion topic(s) with lower traffic.

Relevance can also be based on keyword(s). For example, keyword extraction can be performed on subject or "re:" lines of electronic interactions to determine relevance. Alternatively, keyword(s) can be extracted from all or a part of the electronic interaction (e.g., body of the e-mail) to determine relevance. Relevance can further be based on the size of electronic interactions associated with discussion topics. For example, a particular discussion topic with a relatively small quantity of electronic interactions but for which the electronic interactions are particularly voluminous (e.g., lengthy email/posting) can be treated as more relevant than other discussion topic(s).

The highlight view automatically generated by the analysis component can present information associated with electronic interactions in a format that facilitates comprehension of conversation threads associated with a discussion list. For example, the highlight view can present a readable synopsis of the electronic interactions capable of being understood by a casual observer. The highlight view can present a filtered and/or annotated high-level representation of the electronic interactions—suitable for use by a novice and/or expert of the topic of a discussion list. Additionally, the highlight view can include an automatically summarized version of the original electronic interactions.

In accordance with another aspect of the subject invention, the analysis component can employ collaborative filtering and keyword extraction to generate the highlight view for a particular user and/or group of users. Using collaborative filtering technique(s), the analysis component can personalize the highlight view for a particular user and/or group of users.

The analysis component can be trained over a period time to monitor a user's actions and to further take those actions into account when generating a highlight view for the particular user (e.g., based on inference). Thus, in this example, the analysis component can track a user of a discussion list associated with a particular software program and note that the user frequently reviews particular conversation threads. In generating a highlight view for this user, the analysis component can employ these observations to present greater information regarding emails and/or conversation threads associated with the particular software program to this particular user. In this example, other conversation threads and/or emails are not presented to this user, presented less prominently and/or presented with less detail provided.

Yet another aspect of the subject invention provides for the analysis component to remove extraneous information from electronic interactions (e.g., email signature line and/or repeated information in in-line replies). The analysis component can review electronic interactions (e.g., e-mails) from a particular user in order to identify and remove the user's signature line. Alternatively, the analysis component can be trained to remove information to which a user has replied (e.g., original message).

Another aspect of the subject invention provides for the analysis component to include a filter that filters electronic interactions receives from the input component. The filter can filter electronic interactions based on the originator of the electronic interactions. Alternatively, the filter can exclude and/or include electronic interactions based on originator. Further, the filter can apply keyword extraction to include and/or exclude electronic interactions. The filter can additionally employ collaborative filtering to the electronic interactions using learning procedures from user data that captures the history of the review of electronic interactions by a user and/or a group of users. Once constructed, the collaborative filtering models can be used to filter electronic interactions by inferring preferences of user(s). Once the electronic interactions have been filtered by the filter, a highlight view generator can generate a highlight view of the electronic interactions (e.g., emails) providing a linear progression on one or more conversation threads including signal word(s) as discussed previously.

To the accomplishment of the foregoing and related ends, certain illustrative aspects of the subject invention are described herein in connection with the following description and the annexed drawings. These aspects are indicative, however, of but a few of the various ways in which the principles of the subject invention may be employed and the subject invention is intended to include all such aspects and their equivalents. Other advantages and novel features of the subject invention may become apparent from the following detailed description of the subject invention when considered in conjunction with the drawings.

DETAILED DESCRIPTION OF THE INVENTION

Figure 1:
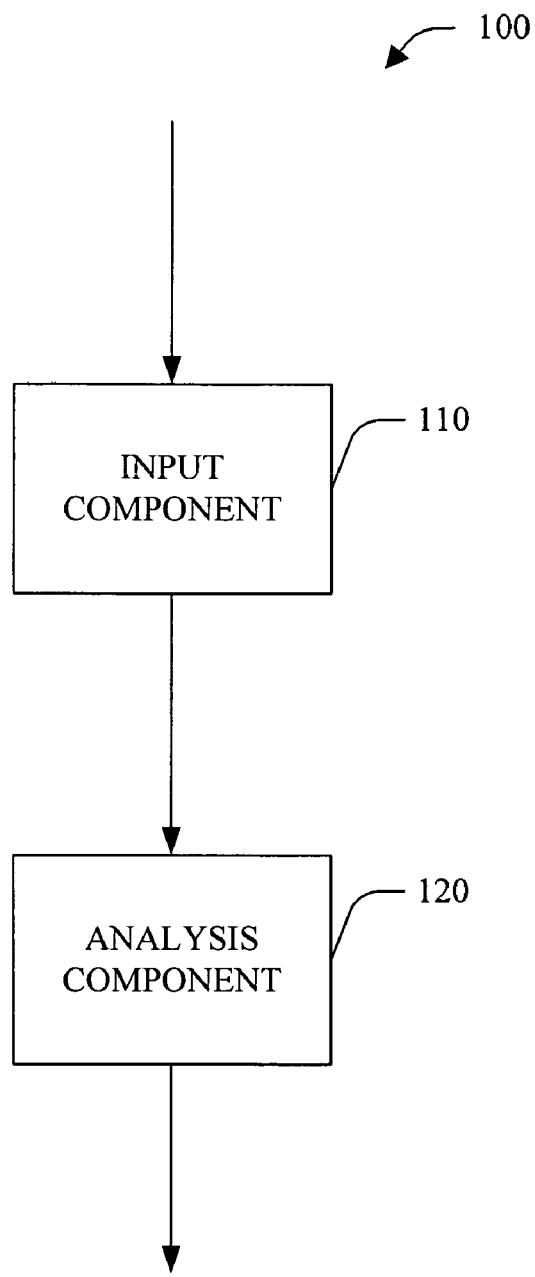
FIG. 1 is a block diagram of an electronic interactions highlight system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the subject invention.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions therefrom. For instance, by observing that one user interacts with a subset of other users over a network, it may be determined or inferred that this subset of users belongs to a desired social network of interest for the one user as opposed to a plurality of other users who are never or rarely interacted with.

Referring to FIG. 1, an electronic interactions highlight system 100 in accordance with an aspect of the subject invention is illustrated. Electronic interactions can include, for example, documents, emails, instant messages, audio messages and/or video messages. The system 100 automatically generates a highlight view of the electronic interactions, for example, to facilitate a user's understanding of the electronic interactions.

Figure 2:
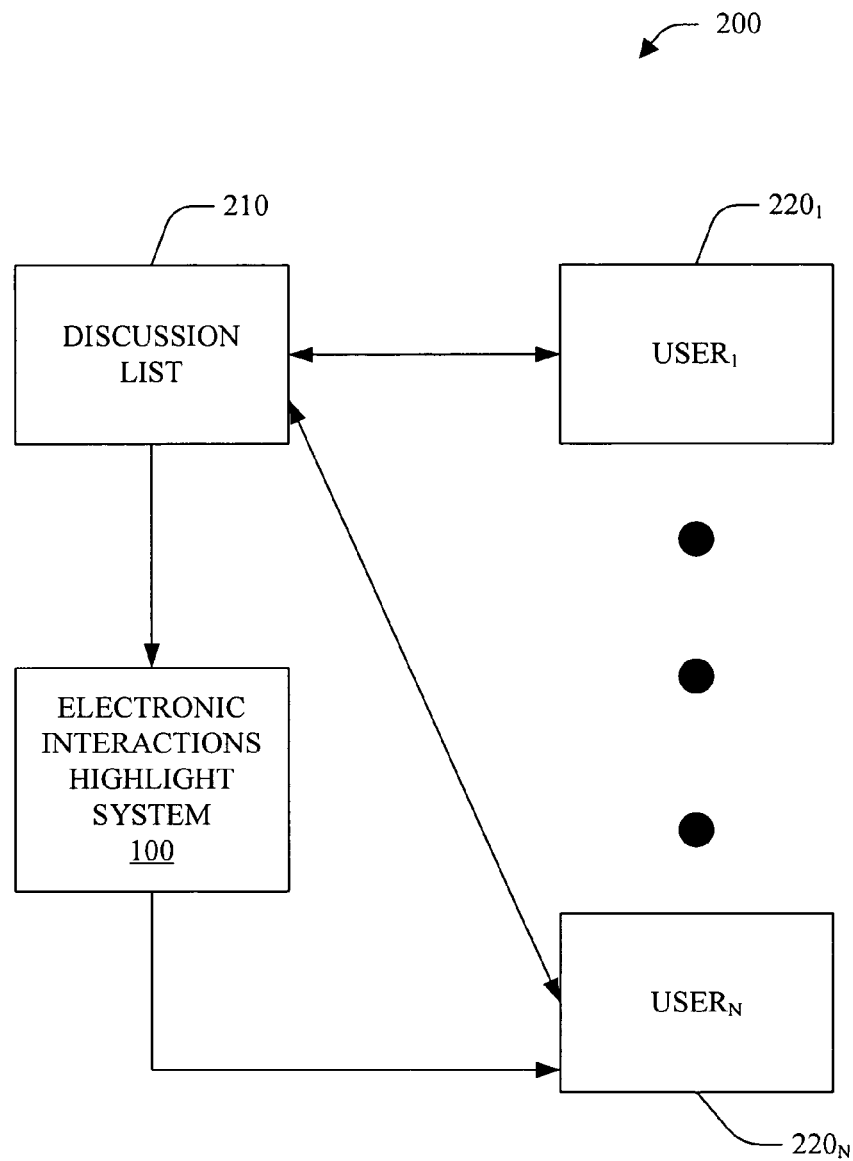
FIG. 2 is a block diagram of a discussion list highlight system in accordance with an aspect of the subject invention.

Turning briefly to FIG. 2, in one example, the electronic interactions comprise emails associated with conversation threads of a discussion list 210 posted and/or received by a plurality of users 220. In this example, the highlight view generated by the system 100 can include, for a given period of time, a list of participants in the discussion list, a list of conversation threads, a quantity of message(s) in a particular conversation thread, URLs and/or file share location(s), if any, referred to in the conversation thread and/or a linear progression of one or more of the conversation threads. The highlight view can be sent via email to one or more of the users 220.

Returning to FIG. 1, the system 100 includes an input component 110 that receives electronic interactions (e.g., emails associated with conversation thread(s) of a discussion list). For example, the electronic interactions can be associated with a given time period (e.g., one week).

The system 100 further includes an analysis component 120 that analyzes the electronic interactions and automatically generates a highlight view of the electronic interactions which can facilitate a user's review of the electronic interactions. The highlight view can simplify a user's understanding of conversation threads associated with a discussion list. The highlight view can include, for example, for a given period of time, a list of participants in the discussion list, a list of conversation threads, a quantity of message(s) in a particular conversation thread, URLs and/or file share location(s), if any, referred to in the conversation thread and/or a linear progression of one or more of the conversation threads.

The linear progression of one or more conversation threads can include signal word(s), such as, "stated, "asked", "responded", "wrapped up", "disagreed", "agreed" etc. that facilitate a user's comprehension of the individual e-mails which form the conversation thread. For example, with respect to an initial email from USER A in a conversation thread, the analysis component 120 can add the introductory signal words "USER A began". Exemplary signal words are included in Table 1:

TABLE 1

| Trigger | Associated Signal word(s) |
| --- | --- |
| <initial email> | Began |
| ? | Asked |
| . | Stated |
| <reply to an email> | Responded |
| disagree, do not agree etc. | Disagreed |
| agree | Agreed |
| <last email of a chain> | Concluded or wrapped up |

Optionally, the analysis component 120 can organize the highlight view based on relevance of a plurality of discussion topics. Relevance can be based, for example, on the quantity of electronic interactions (e.g., emails/postings) associated with the discussion topics. In this example, discussion topics with high traffic can be treated as more relevant than discussion topic(s) with lower traffic.

Relevance can also be based on keyword(s). For example, keyword extraction can be performed on subject or "re:" lines of electronic interactions to determine relevance. Alternatively, keyword(s) can be extracted from all or a part of the electronic interaction (e.g., body of the e-mail) to determine relevance. In this example, words such as "critical", "important", "serious", etc. can be employed to determine relevance of discussion topics.

Relevance can further be based on the size of electronic interactions associated with discussion topics. For example, a particular discussion topic with a relatively small quantity of electronic interactions but for which the electronic interactions are particularly voluminous (e.g., lengthy email/posting) can be treated as more relevant than other discussion topic(s).

The highlight view automatically generated by the analysis component 120 can present information associated with electronic interactions in a format that facilitates comprehension of conversation threads associated with a discussion list. For example, the highlight view can present a readable synopsis of the electronic interactions capable of being understood by a casual observer. Additionally and/or alternatively, the highlight view can present a filtered and/or annotated high-level representation of the electronic interactions. Thus, the system 100 can be suitable for use by a novice and/or expert of the topic of a discussion list. Optionally, the highlight view can include an automatically summarized version of the original electronic interactions.

In another example, the analysis component 120 can employ collaborative filtering and keyword extraction to generate the highlight view for a particular user and/or group of users. Collaborative filtering is the task of predicting user preferences over items, in this example, electronic interactions. Using collaborative filtering technique(s), the analysis component can personalize the highlight view for a particular user and/or group of users.

For example, the analysis component 120 can be trained over a period time to monitor a user's actions and to further take those actions into account when generating a highlight view for the particular user (e.g., based on inference). Thus, in this example, the analysis component 120 can track a user of a discussion list associated with a particular software program and note that the user frequently reviews conversation threads associated with software bugs. In generating a highlight view for this user, the analysis component 120 can employ these observations to present greater information regarding emails and/or conversation threads associated with software bugs to this particular user. In this example, other conversation threads and/or emails are not presented to this user, presented less prominently and/or presented with less detail provided.

In another example, the analysis component 120 can remove extraneous information from electronic interactions (e.g., email signature line and/or repeated information in in-line replies). The analysis component 120 can review electronic interactions (e.g., e-mails) from a particular user in order to identify the user's signature line. For example, a particular user, USER A, can use the following signature line on the user's email:

TABLE 2

USER A
B Corporation

TABLE 2-continued

123 Any Street
Anytown, Washington which can be distracting to user's desiring to understand the content of a particular conversation thread. Thus, in this example, the analysis component 120 can be trained to identifying this extraneous information and block it from the user in the generated highlight view.

Alternatively, the analysis component 120 can be trained to remove information to which a user has replied (e.g., original message). For example, a first user, USER A, can post an inquiry:

TABLE 3

What is the status of project A?

TABLE 4

The project will be completed by end of business Monday.
---Original Message---
From: USER A
Sent: Friday, Jan. 28, 2005 4:36 P.M.
To: Discussion List
Subject: Project A
What is the status of project A?

In this example, the information including and following "-----Original Message-----" is deemed extraneous since it does not add to a user's understanding of the conversation thread in the highlight view generated by the analysis component 120. Accordingly, the analysis component 120 can identify the extraneous information and block it from the user in the generated highlight view.

Figure 3:
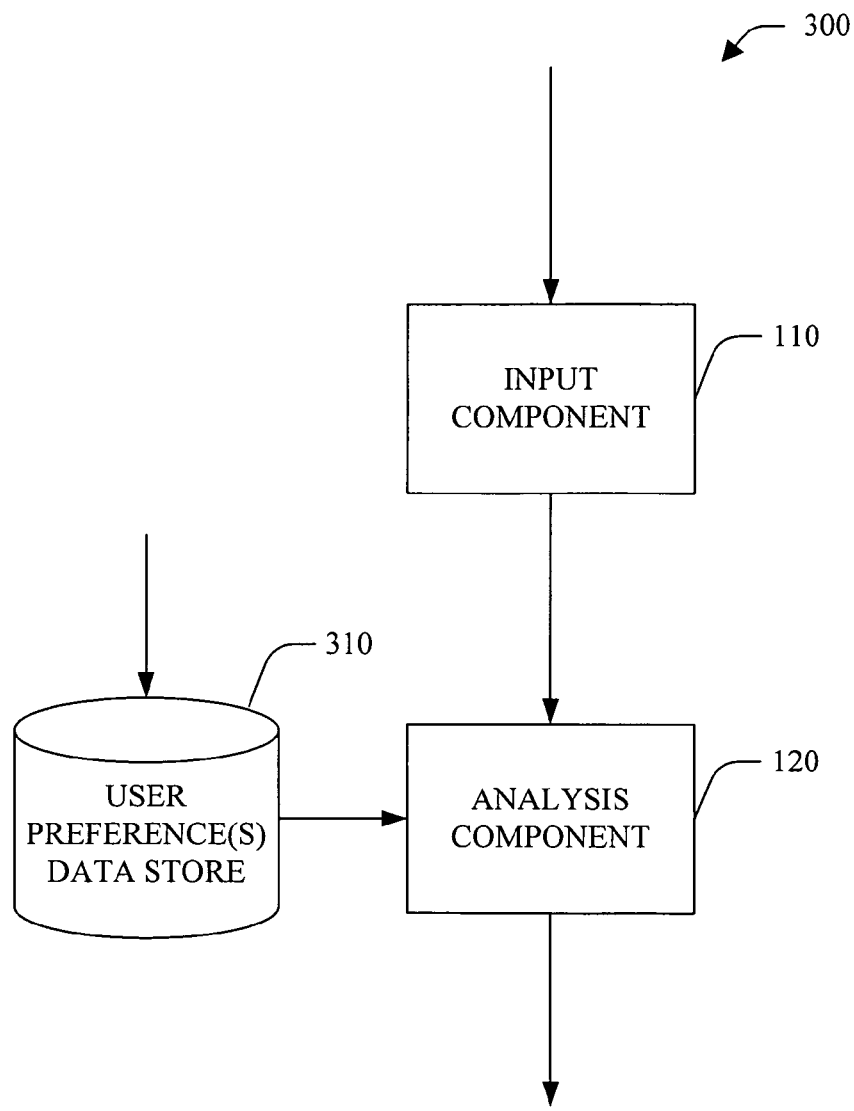
FIG. 3 is a block diagram of an electronic interactions highlight system in accordance with an aspect of the subject invention.

Referring next to FIG. 3, an electronic interactions highlight system 300 in accordance with an aspect of the subject invention is illustrated. The system 300 includes an input component 110 and an analysis component 120. The system 300 further includes a user preference(s) data store 310 that stores information associated with a user's preference(s) for analysis and/or generation of the highlight view. Information stored in the user preference(s) data store 310 can be employed by the analysis component 120, for example, in determining relevance of conversation thread(s), keyword(s) and/or originator(s) of post(s).

For example, a user can identify originator(s) whose posting(s) may be of significance to the user (e.g., user's supervisor and/or an expert on a particular topic). Alternatively, the user can identify originator(s) whose posting(s) are of little consequence to the user (e.g., originator(s) known to have little expertise in a particular field). This information can be stored in the user preference(s) data store 310 and used by the analysis component 120 in generating the highlight view.

Figure 4:
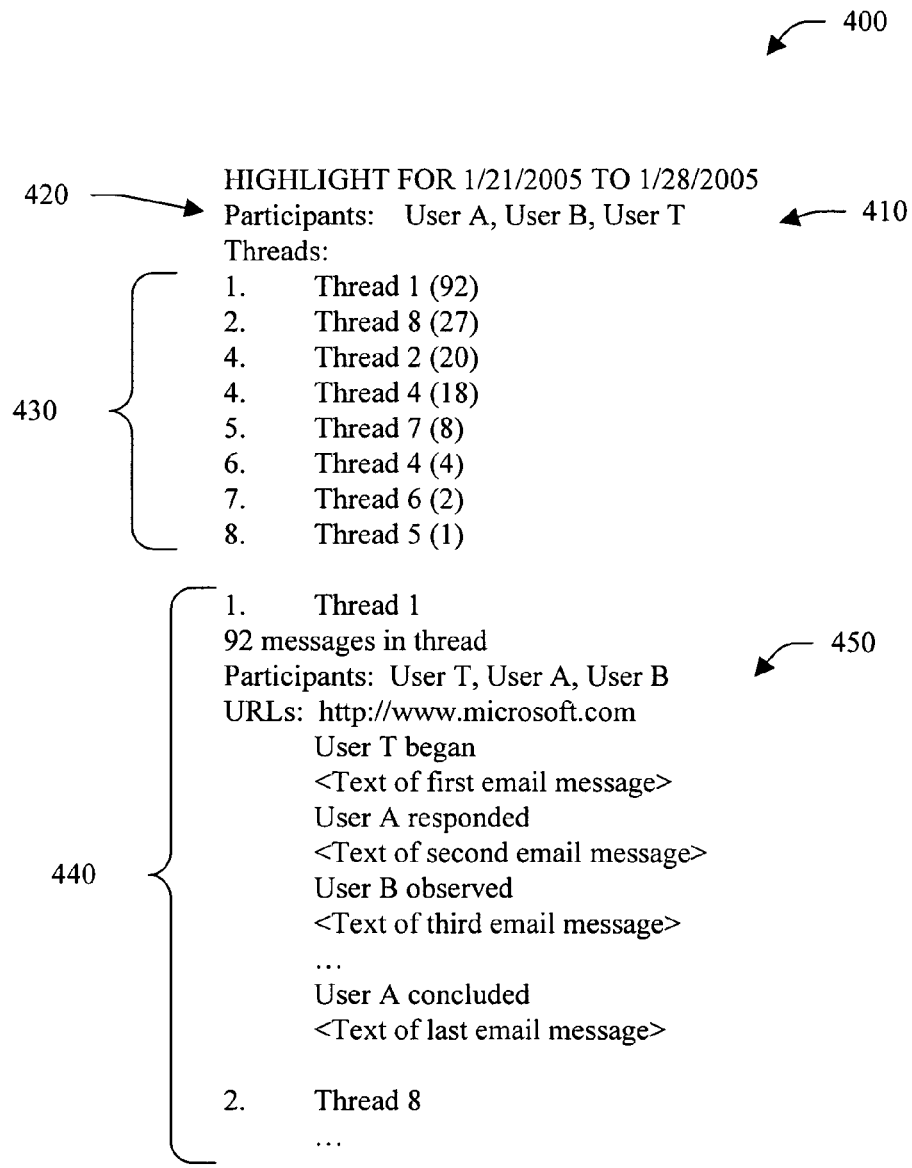
FIG. 4 is a diagram of an exemplary highlight view in accordance with an aspect of the subject invention.

Next, referring to FIG. 4, an exemplary highlight view 400 in accordance with an aspect of the subject invention is illustrated. The exemplary highlight view 400 includes a time period section 410. The time period section 410 identifies the relevant time period for which the highlight view 400 has been generated. In this example, the highlight view 400 is associated with conversation threads of a discussion list.

The exemplary highlight view 400 further includes a participant list 420 that identifies participant(s) in conversation threads included in the highlight view. The exemplary highlight view 400 further includes a list of threads section 430 included in the highlight view. For example, the list of threads 430 can be organized by relevance as discussed previously. The exemplary highlight view 400 includes a topics section 440 that provides a highlight view of the topics 450 identified in the list of topics section 430.

Figure 5:
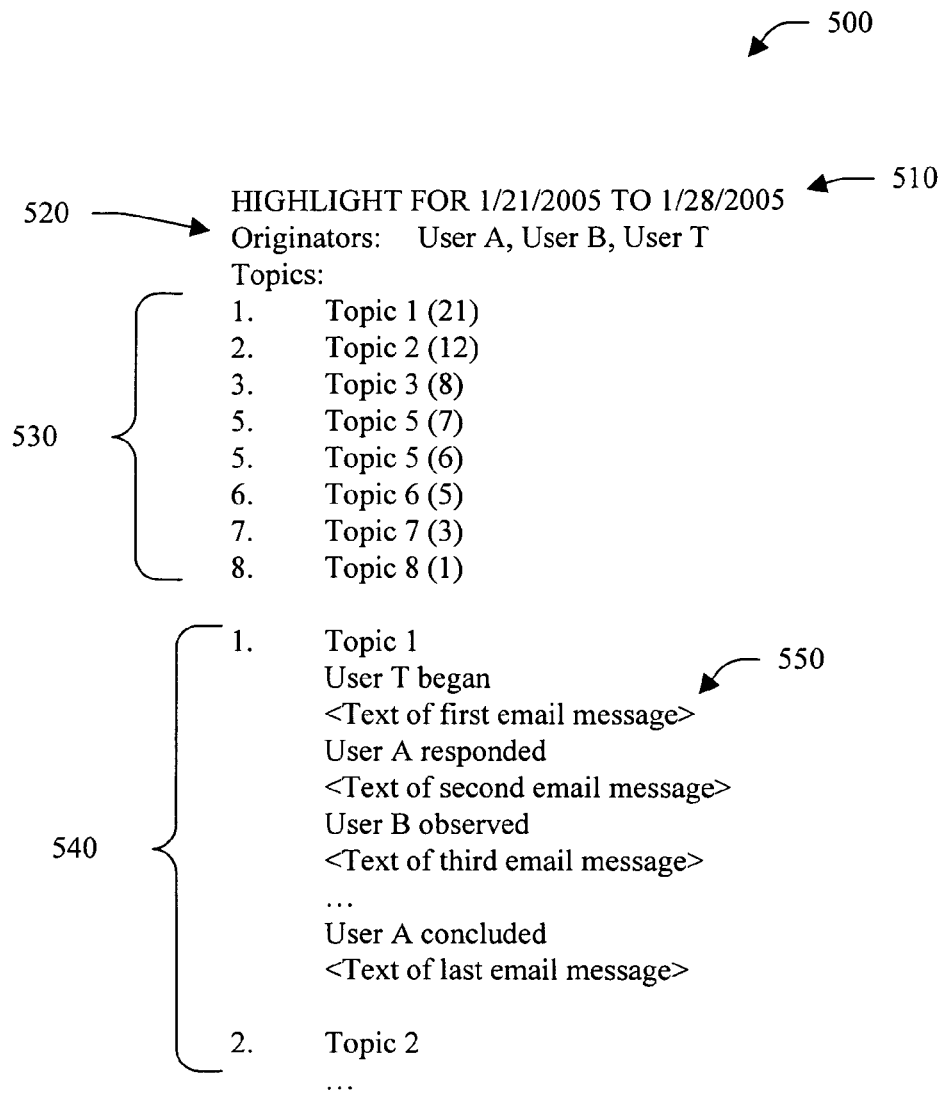
FIG. 5 is a diagram of an exemplary highlight view in accordance with an aspect of the subject invention.

Turning to FIG. 5, an exemplary highlight view 500 in accordance with an aspect of the subject invention is illustrated. The exemplary highlight view 500 includes a time period section 510. The time period section identifies the relevant time period for which the highlight view 500 has been generated. In this example, the highlight view 500 is associated with a user's email inbox.

The highlight view 500 further includes an originators list 520 that identifies originator(s) of emails included in the highlight view. The highlight view 500 further includes a list of topics section 530 included in the highlight view 500. For example, the list of topics 530 can be organized by relevance as discussed previously.

The highlight view 500 includes a topics section 540 that provides a highlight view of the topics 550 identified in the list of topics section 530. In this example, the text of an email message is again introduced with signal words, as discussed above, to facilitate the user's understanding of the highlight view presented in a linear progression.

Figure 6:
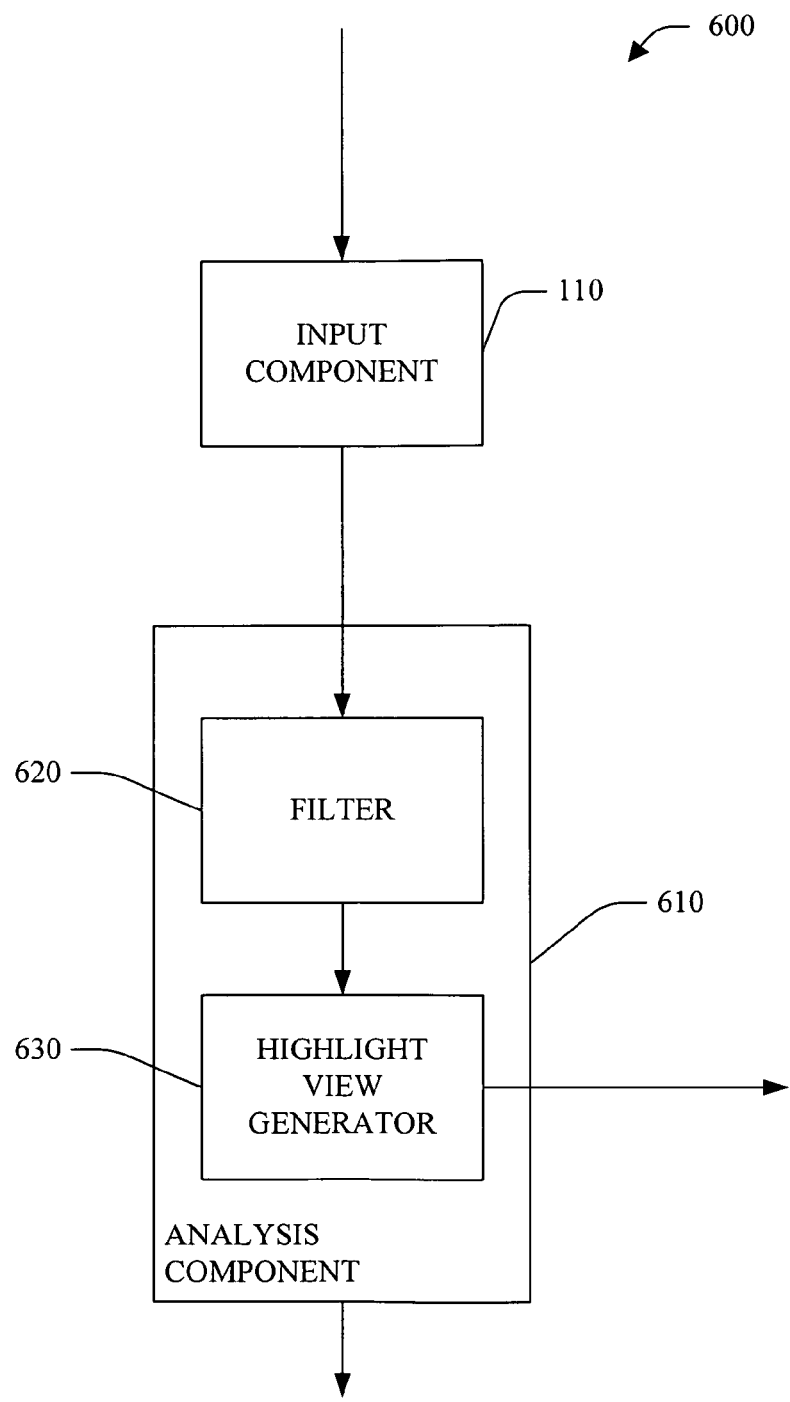
FIG. 6 is a block diagram of an electronic interactions highlight system in accordance with an aspect of the subject invention.

Referring to FIG. 6, an exemplary electronic interactions highlight system 600 in accordance with an aspect of the subject invention is illustrated. The system 600 includes an input component 110 and an analysis component 610 having a filter 620 and a highlight view generator 630.

The filter 620 filters electronic interactions receives from the input component 110. In one example, the filter 620 filters electronic interactions based on the originator of the electronic interactions. For example, the filter 620 can exclude and/or include electronic interactions based on originator. Alternatively, the filter 620 can apply keyword extraction to include and/or exclude electronic interactions.

In yet another example, the filter 610 can employ collaborative filtering to the electronic interactions using learning procedures from user data that captures the history of the review of electronic interactions by a user and/or a group of users. Once constructed, the collaborative filtering models can be used to filter electronic interactions by inferring preferences of user(s).

For example, once a target time period has been identified, appropriate information or evidence about a user's preferences are input into the collaborative filtering model of the filter 620 (e.g., constructed from user log file(s)). Evidence can take many forms, including explicit input of samples of preferred items by users. Evidence of preferences also includes the gathering of implicit evidence of items that are liked or disliked via monitoring of a user's activity. For example, evidence of a user's preferences can be gathered implicitly by monitoring content that the user has dwelled on for some threshold amount of time-taking the dwell time as a surrogate of interest. Interest can also be inferred by monitoring items that the user has requested to be viewed. A user reviewing an item over a threshold period of time can be an indication that the user is interested in the item and similar type items. Furthermore, a brief review and jump away from a selected item to other content can be inferred to as a dislike.

Once the electronic interactions have been filtered by the filter 620, the highlight view generator 630 can generate a highlight view of the electronic interactions (e.g., emails). The highlight view facilitates a user's review of the filtered electronic interactions. For example, the highlight view can simplify a user's review of conversation threads associated with a discussion list. The highlight view can include, for example, for a given period of time, a list of participants in the discussion list, a list of conversation threads and/or a linear progression of one or more of the conversation threads.

As noted previously, the linear progression of one or more conversation threads can include signal word(s), such as, "stated, "asked", "responded", "wrapped up", "disagreed", "agreed" etc. that facilitate a user's comprehension of the individual e-mails which form the conversation thread. The signal word(s) can be added by the highlight view generator 630.

It is to be appreciated that the system 100, the input component 110, the analysis component 120, the system 300, the user preference(s) data store 310, the system 600, the analysis component 610, the filter 620 and/or the highlight view generator 630 can be computer components as that term is defined herein.

Figure 7:
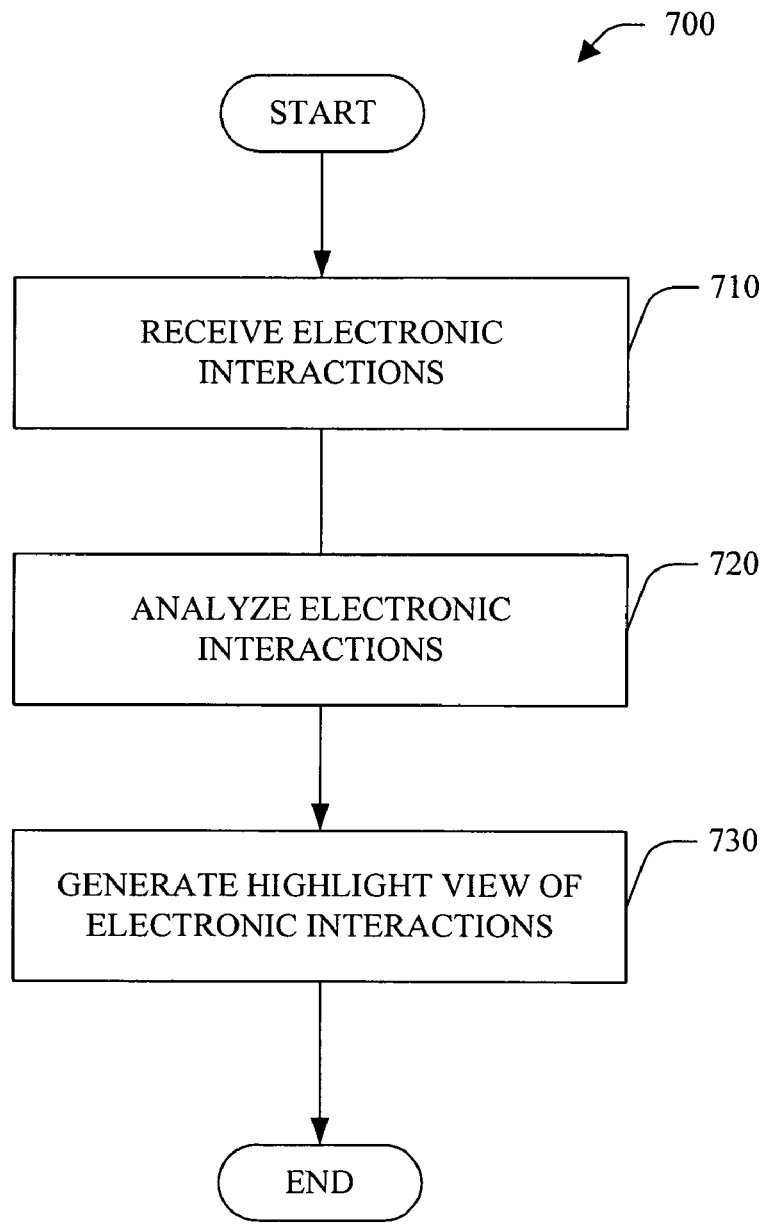
FIG. 7 is a flow chart of a method for highlighting electronic interactions in accordance with an aspect of the subject invention.

Turning briefly to FIG. 7, a methodology that may be implemented in accordance with the subject invention are illustrated. While, for purposes of simplicity of explanation, the methodology is shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodology in accordance with the subject invention.

The subject invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 7, a method for highlighting electronic interactions 700 in accordance with an aspect of the subject invention is illustrated. At 710, electronic interactions are received. For example, the electronic interactions can include e-mails, comments related to conversation threads, instant messages, audio messages and/or video messages.

At 720, the electronic interactions are analyzed. For example, analysis can be based upon collaborative filtering and/or keyword extraction, as discussed above. Additionally and/or alternatively, analysis can be based upon user criteria (e.g., conversation threads of interest and/or originator(s) to include and/or exclude).

At 730, a highlight view of the electronic interactions is generated. The highlight view can facilitate a user's understanding of the electronic interactions. For example, the generated highlight view can include, for a given period of time, a list of participants in the discussion list, a list of conversation threads and/or a linear progression of one or more of the conversation threads.

Figure 8:
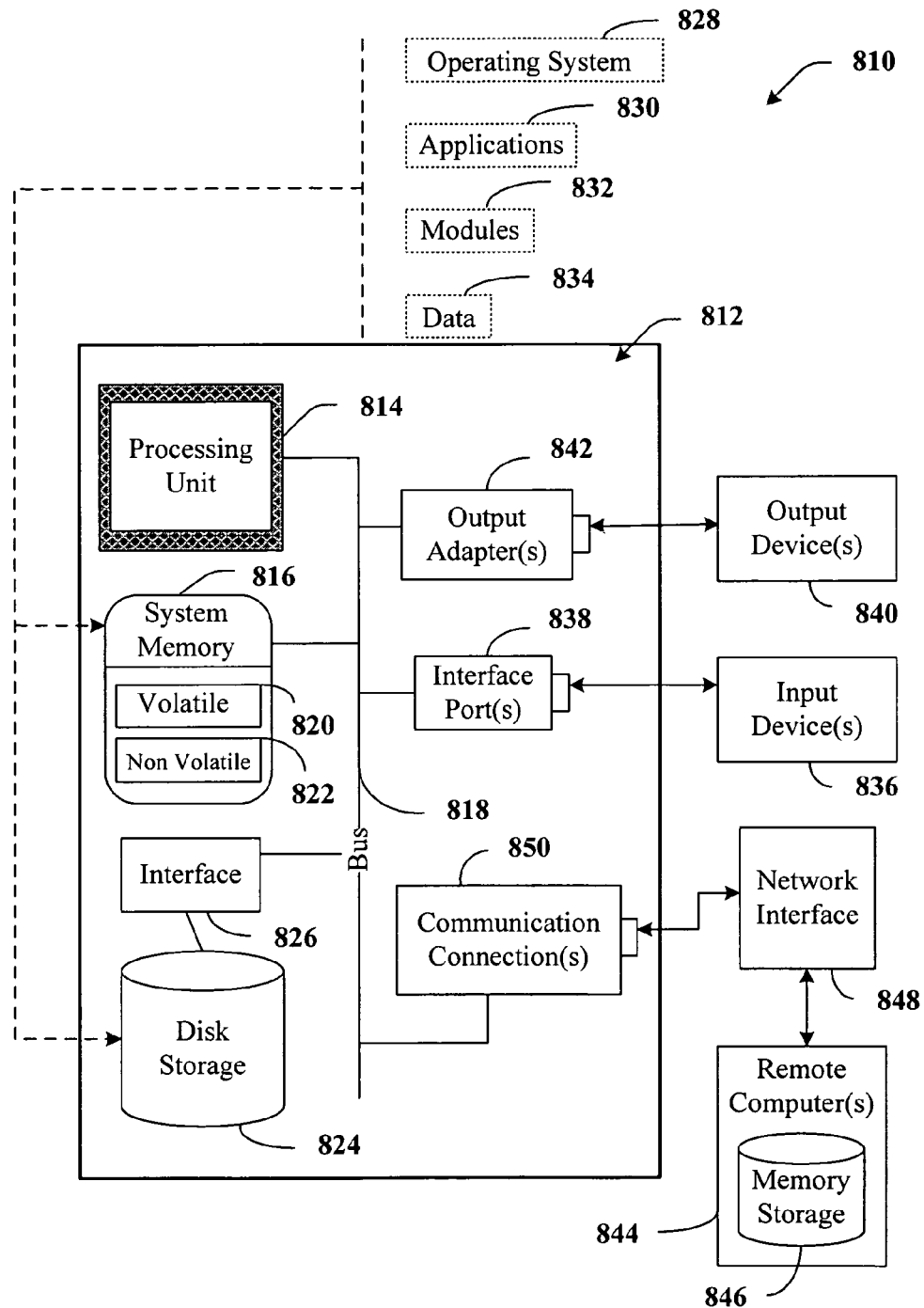
FIG. 8 illustrates an example operating environment in which the invention may function.

In order to provide additional context for various aspects of the subject invention, FIG. 8 and the following discussion are intended to provide a brief, general description of a suitable operating environment 810 in which various aspects of the subject invention may be implemented. While the subject invention is described in the general context of computer-executable instructions, such as program modules, executed by one or more computers or other devices, those skilled in the art will recognize that the subject invention can also be implemented in combination with other program modules and/or as a combination of hardware and software. Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the subject invention. Other well known computer systems, environments, and/or configurations that may be suitable for use with the subject invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 for implementing various aspects of the subject invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the subject invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An electronic interactions highlight system recorded on computer-readable storage media and capable of execution by a computer, the electronic interactions highlight system comprising:
   an input component configured to receive a plurality of electronic interactions;
   an analysis component configured to monitor a user's actions and employ observations to personalize a highlight view for a particular user or group of users by analyzing the plurality of electronic interactions and employing a collaborative filtering model and keyword extraction to automatically generate the highlight view, the highlight view organized based on a relevance of each of the plurality of electronic interactions, the relevance determined based on a quantity of electronic interactions associated with a particular discussion topic and a size of the electronic interactions associated with the particular discussion topic; and
   an output component configured to send via email the highlight view to the particular user or the group of users, wherein:
   the highlight view is organized based on relevance of a plurality of discussion topics determined via keywords extracted from all or a part of the plurality of electronic interactions,
   extraneous information is identified by the analysis component and blocked from the user in the generated highlight view, and
   a threshold time period is identified and evidence of the user's preferences is gathered implicitly by monitoring content that the user has dwelled on for the threshold amount of time and monitoring items that the user has requested to be viewed.

2. The system of claim 1, the plurality of electronic interactions associated with a plurality of topics.

3. The system of claim 2, the analysis component generating the highlight view based, at least in part, upon a hierarchical organization of the plurality of topics.

4. The system of claim 1, the plurality of electronic interactions associated with a predetermined period of time.

5. The system of claim 1, the plurality of electronic interactions comprising at least one of a document, an email, an instant message, an audio message and a video message.

6. The system of claim 1, the analysis component employs logical inferences including analyzing the frequency of keywords in the plurality of electronic interactions and weighting such words as of being of potential interest to a given user.

7. The system of claim 1, the electronic interactions comprising comments related to conversation threads.

8. The system of claim 1, the highlight view comprising additional signal words between at least some of the electronic interactions, the additional signal words facilitating the user's comprehension of the at least some of the electronic interactions which form at least one conversation thread.

9. The system of claim 1, extraneous information from at least some of the electronic interactions filtered by the analysis component prior to generation of the highlight view.

10. The system of claim 1, analysis by the analysis component is based, at least in part, upon user criteria.

11. The system of claim 10, the user criteria comprising at least one of a keyword, a topic, an electronic interaction originator, and information associated with an electronic interaction originator.

12. The system of claim 1, at least some of the plurality of electronic interactions automatically summarized by the analysis component, the automatically summarized electronic interactions included in the highlight view.

13. A method comprising:
under control of one or more processors configured with instructions executable by the one or more processors to perform acts comprising:
receiving a plurality of electronic interactions;
performing an analysis of the plurality of electronic interactions using a collaborative filtering model and keyword extraction, including identifying actions of a user in the plurality of electronic interactions, identifying content that the user has dwelled on for a threshold time period, and identifying items that the user has requested for viewing;
determining preferences associated with the user based on the analysis;
automatically generating a highlight view for the user, the highlight view blocking extraneous information from the user, the highlight view organized based on a relevance of each of the plurality of electronic interactions, the relevance determined based on:
a quantity of electronic interactions associated with a particular discussion topic,
a size of the electronic interactions associated with the particular discussion topic,
a relevance of a plurality of discussion topics determined via keywords extracted from at least a portion of the plurality of electronic interactions, and
the gathered preferences; and
sending, to the user, an electronic message that includes the highlight view.

14. The method of claim 13, wherein the highlight view is generated based, at least in part, upon a hierarchical organization of the electronic interactions.

15. The method of claim 13, wherein the plurality of electronic interactions gathered over a predetermined period of time.

16. The method of claim 13, wherein the plurality of electronic interactions comprise at least one of a document, an email, an instant message, an audio message and a video message.

17. A computer-readable memory device to store instructions executable by one or more processors to perform acts comprising:
receiving a plurality of electronic interactions;
performing an analysis of the plurality of electronic interactions using a collaborative filtering model and keyword extraction, including identifying actions of a user in the plurality of electronic interactions, identifying content that the user has dwelled on for a threshold time period, and identifying items that the user has requested for viewing;
determining preferences associated with the user based on the analysis;
automatically generating a highlight view for the user, the highlight view blocking extraneous information from the user, the highlight view organized based on a relevance of each of the plurality of electronic interactions, the relevance determined based on:
a quantity of electronic interactions associated with a particular discussion topic,
a size of the electronic interactions associated with the particular discussion topic,
a relevance of a plurality of discussion topics determined via keywords extracted from at least a portion of the plurality of electronic interactions, and
the gathered preferences; and
sending, to the user, an electronic message that includes the highlight view.

18. The computer-readable memory device of claim 17, wherein the highlight view includes additional signal words between at least some of the electronic interactions, the additional signal words facilitating the user's comprehension of the at least some of the electronic interactions which form at least one conversation thread.

19. The computer-readable memory device of claim 18, wherein the analysis is based, at least in part, upon user criteria.

20. The computer-readable memory device of claim 19, wherein the user criteria comprising at least one of a keyword, a topic, an electronic interaction originator, and information associated with an electronic interaction originator.

* * * * *